J. D. McBride.
Trough & Double Rack for Feeding Sheep &c.
No 73426. Patented Jan. 14, 1868.

Witnesses:
Frank Smith
Geo. C. Lambright

Inventor:
Jas. D. McBride

United States Patent Office.

JAMES DOUGLASS McBRIDE, OF MANSFIELD, OHIO.

Letters Patent No. 73,426, dated January 14, 1868.

---

COMBINED TROUGH AND DOUBLE-RACK FOR FEEDING SHEEP, CATTLE, AND HORSES.

---

*The Schedule referred to in these Letters Patent and making part of the same.*

---

TO ALL WHOM IT MAY CONCERN:

Be it known that I, JAMES DOUGLASS McBRIDE, of Mansfield, in the county of Richland, and in the State of Ohio, have invented certain new and useful Improvements in Combined Trough and Double-Rack for Feeding Sheep, Cattle, and Horses; and I do hereby that the following is a full, clear, and exact description thereof, reference being had to the accompanying drawings, and to the letters of reference marked thereon.

In the annexed drawings, making part of this specification, A represents a box-trough, made with flaring sides, and of any desirable depth and length, and wide enough so that sheep or cattle can feed upon both sides of it. Beneath this trough are placed three sills—one near each end, and one about its centre—upon which it rests. Uprights $k$ $k$ are erected upon these sills, at their ends, having their inner edges bevelled, so that they embrace the inclined sides of the trough for the purpose of holding it steady in position, preventing its rocking, &c. Supplementary troughs are formed in the trough A, along and near the upper edges of its sides. To form these troughs, I use two boards, B B, which are as long as the box A, inside measurement, and which have their ends mitred, so that they fit snugly against the ends of the box, thus forming ends for themselves. These boards B B are hinged at their lower edges to the sides of the box, so that they may be opened out at right angles to them, or may be closed up, so that they will lie against them, as may be desirable. $a$ $a$ represent cleats or rest-blocks, which are secured to the sides of the box A, beneath the boards B B, and answer the purpose of supports for said boards when they are opened out to form troughs.

Figure 1:
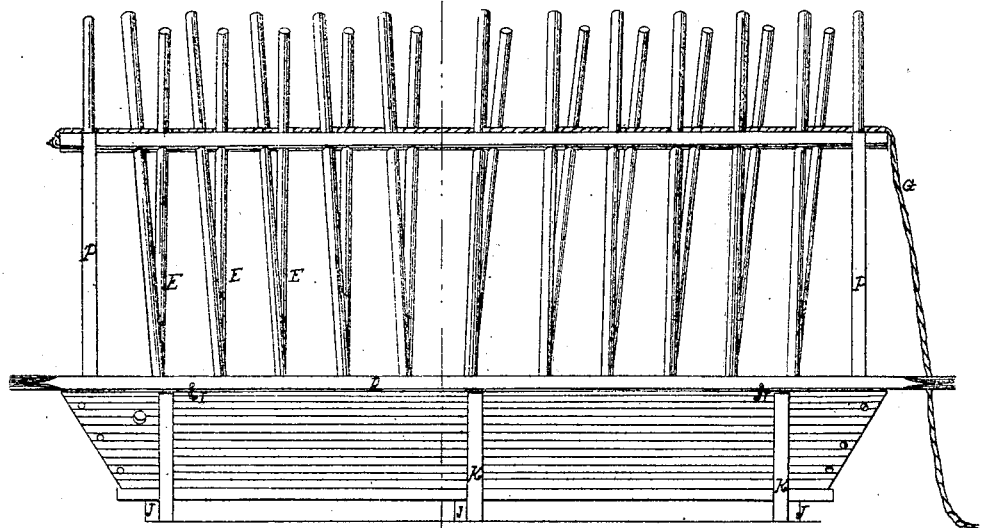
Figure 2:
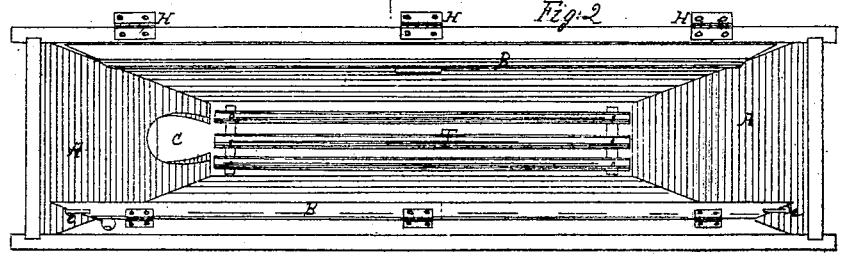
Figure 3:
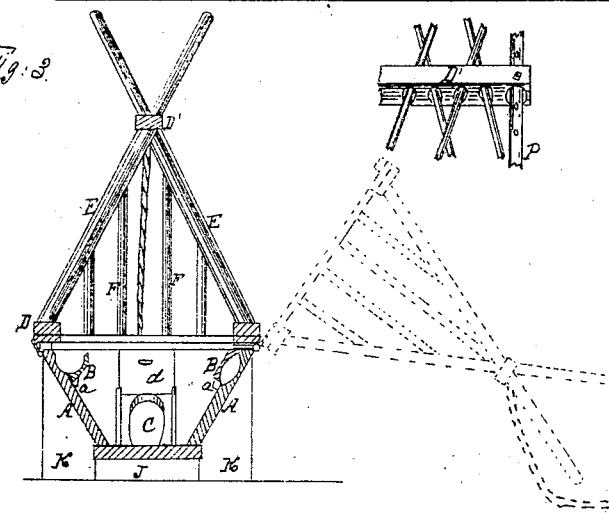

The inner faces of the boards B B are made concave, and the sides of the box opposite are made to correspond in shape with them, so that the bottoms of the troughs are not angular, but rounding, as is seen in the end view, Figure 3. The object of this arrangement is, that, in feeding grain to sheep or cattle, they will be able to gather it up clean from the troughs. A hole is made through the sides of the box A, near the end of each trough, so that the grain which is left after feeding, or when it is desirable to clear the troughs, can be removed through them, and caught in a bag or any other suitable receptacle placed there for that purpose.

In one end of the box A is a doorway, C, which is provided with a sliding door, $d$. The object of this doorway is to facilitate in the cleaning of the box, or removing from it the seeds which fall from the hay or straw which may be placed in the box for feeding.

A rack is hinged to the upper edge of one side of this box, which forms a cover for it. To make this rack, I use two base-bars, D D, and a top bar, D', which are placed at a suitable distance apart, and, with the end pieces P P, form a triangular frame, with the base of the triangle resting upon the box A.

E E represent a series of round bars, made similar to those generally used for stable-racks. These bars have their lower ends made fast in the bars D, and, passing up, cross each other in the bar D', and then project a short distance above it, so as to form an additional rack above bar D. They are placed a sufficient distance apart to allow sheep and cattle to pass their heads in between them. The ends of this rack are provided with the bars F, for properly closing them up.

This rack, as has been stated, is hinged to the upper edge of one side of the box, and rests upon it when in use for feeding. When it is desirable to fill the box and rack with hay, the rack is turned to one side upon its hinges, and the supplementary boxes being closed up, the hay is packed into the box and rack, and is then pressed down and into the rack tightly, by returning the rack to its place, where it is secured down by means of the hooks I I.

The rack may be raised upon its hinges a little above the edge of the trough, at its back, and a block or blocks may be used for raising the front portion of it, so that stalks or straw getting between it and the edges of the box will not prevent its operation. The red lines, fig. 3, show the rack thrown back so that the box may be filled with hay.

It will be seen that a rack is formed by the upper ends of the bars E, where they project above the bar D'.

A rope, G, secured to one end of the bar D', can be passed over straw, which is placed in this rack, for the purpose of securing it firmly in place, and holding it so that cattle cannot draw it out faster than they will eat it. After passing this cord over the straw, it is secured to the other end of the bar D'.

Handles are formed upon the ends of the bars D D, by means of which the rack can be easily operated. It may become necessary to move the trough from place to place; this can easily and readily be accomplished by the handles referred to. A rack-frame, T, is placed in the bottom of the box A, which is removable at pleasure, and the object of which is to allow the seed which falls from the hay and clover, &c., to fall beneath it, to keep the sheep or cattle from consuming it. The bars P are intended to be graduated with suitable holes, so that the bar D' may be raised or lowered, and confined by pins at any desirable point. The object of raising or lowering this bar D' is to enlarge or decrease the racks, of which it forms a part, at pleasure.

Having thus fully described my invention, what I claim as new, and desire to secure by Letters Patent, is—

1. The box-trough A, constructed substantially as described, and provided with the rack T and the supplementary troughs formed by the hinged boards B B, as and for the purpose herein set forth.

2. The rack, composed of the bars D D and D' and bars E, forming a double-rack, and hinged cover for the box A, when used in combination with said box, substantially as set forth.

3. The graduated end-bars P P, used in combination with the bar D', for enlarging or contracting the upper and lower racks, as and for the purpose set forth.

In testimony that I claim the foregoing, I have hereunto set my hand, this 4th day of January, 1868.

JAS. D. McBRIDE.

Witnesses:
C. M. ALEXANDER,
J. M. MASON.